United States Patent
Bogomazov et al.

(10) Patent No.: US 9,771,633 B2
(45) Date of Patent: Sep. 26, 2017

(54) METHOD FOR THE ACID TREATMENT OF RED MUD

(75) Inventors: Aleksandr Viktorovich Bogomazov, g. Boksitogorsk (RU); Aleksandr Sergeevich Senyuta, St. Petersburg (RU)

(73) Assignee: UNITED COMPANY RUSAL ENGINEERING AND TECHNOLOGY CENTRE LLC, G. Krasnoyarsk (RU)

( * ) Notice: Subject to any disclaimer, the term of this patent is extended or adjusted under 35 U.S.C. 154(b) by 139 days.

(21) Appl. No.: 14/415,938

(22) PCT Filed: Jul. 20, 2012

(86) PCT No.: PCT/RU2012/000593
§ 371 (c)(1),
(2), (4) Date: Jan. 20, 2015

(87) PCT Pub. No.: WO2014/014380
PCT Pub. Date: Jan. 23, 2014

(65) Prior Publication Data
US 2016/0369372 A1    Dec. 22, 2016

(51) Int. Cl.
C22B 7/00     (2006.01)
C01F 7/00     (2006.01)
C22B 59/00    (2006.01)
C01F 7/06     (2006.01)
C22B 21/00    (2006.01)
C22B 3/16     (2006.01)

(52) U.S. Cl.
CPC .............. C22B 59/00 (2013.01); C01F 7/066 (2013.01); C22B 3/1608 (2013.01); C22B 7/005 (2013.01); C22B 7/006 (2013.01); C22B 7/007 (2013.01); C22B 21/0023 (2013.01); *Y02P 10/234* (2015.11)

(58) Field of Classification Search
CPC  C22B 3/06; C22B 7/007; C22B 7/005; C22B 21/0023
See application file for complete search history.

(56) References Cited

U.S. PATENT DOCUMENTS

| 3,295,961 | A | 1/1967 | Colombo et al. |
| 4,110,399 | A | 8/1978 | Gaudernack et al. |
| 4,237,102 | A | 5/1979 | Colombo et al. |
| 4,668,485 | A | 5/1987 | Creswell et al. |

FOREIGN PATENT DOCUMENTS

| GB | 2042486 | 9/1980 |
| RU | 2048556 | 11/1995 |
| RU | 2140998 | 11/1999 |
| RU | 2153466 | 7/2000 |
| SU | 1258815 | 9/1986 |

OTHER PUBLICATIONS

RU 2048556 C1. Published Nov. 1995. Machine translation of the description.*
International Search Report mailed Mar. 28, 2013 in PCT/RU2012/000593.
Simakov et al., Nickel and Nickel Alloys Electrochemistry in Cyolite-Alumina Melts, Light Metals 2007, pp. 489-493.

* cited by examiner

*Primary Examiner* — George Wyszomierski
*Assistant Examiner* — Tima M McGuthry Banks
(74) *Attorney, Agent, or Firm* — Hogan Lovells US LLP

(57) ABSTRACT

The invention relates to the metallurgical industry, specifically to the acid treatment of red mud obtained in the process of producing alumina, and can be used in technologies for recycling waste from alumina refinery holding ponds. The method for the acid treatment of red mud involves leaching using a leaching agent comprised of water-soluable aliphatic carbonic acids having fewer than 3 carbon atoms per molecule, filtering the solution, and separating the recoverable end products. To ensure a high level of recovery of valuable components and the increased productivity of the process, leaching is conducted with the addition of red mud in portions and with the control of pH values, and when a target pH value of between 2.3 and 3.8 is reached, no more red mud is added, and once leaching is complete, the solution is kept at a given leaching temperature for no less than one hour.

1 Claim, No Drawings

METHOD FOR THE ACID TREATMENT OF RED MUD

This application is a U.S. National Phase under 35 U.S.C. §371 of International Application PCT/RU2012/000593, filed on Jul. 20, 2012. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention relates to the metallurgical industry, namely, to the acid treatment of red mud produced during alumina production, and can be used in technologies for recycling waste from alumina refinery holding ponds.

A method is known for treating red mud from alumina production by leaching with sulfuric acid to transfer valuable components into solution (RU, patent 2140998, C22B7/00, C22B59/00, published Nov. 10, 1999). The leaching is carried out with sulfuric acid at a concentration of 74-100 g/L at a temperature not lower than 64° C.

A drawback of said method is that within the stated temperature and concentration ranges, a degree of extracting the main valuable component, scandium, into solution of greater than 50% is not achieved, since beyond these limits, the limiting factor is slurry "plastering"—its transformation into a thick, viscous mass, making it extremely difficult to separate the end product, the scandium-containing solution.

The closest to the claimed method is a method for recovering aluminum, calcium, and rare earth metals from the red mud from alumina production, including acid leaching, filtering the solution, and separating the recoverable end products (RU, patent 2048556, C22B21/00, C22B26/20, C22B59/00, C01F7/02, publ. Nov. 20, 1995). The leaching is carried out using as the leaching agent water-soluble aliphatic carboxylic acids with fewer than 3 carbon atoms in the molecule at a weight ratio of the dry solid and liquid phases of 1:(4-18), and acid concentration of 3-25% at a temperature of 30-80° C. for 0.5-3 hours. An aqueous solution of formic acid (HCOOH) and an aqueous solution of acetic acid ($CH_3COOH$) with various concentrations are used as the leaching agent.

A deficiency of said method is the lack of pH control, which is a crucial informative parameter for leaching process control, because the precipitation of metal hydroxides occurs in very narrow ranges of acidity. Thus, $TiO(OH)_2$ even at pH=2 is completely converted into the solid phase. $Fe(OH)_3$ starts to partially precipitate at pH=1.5 and precipitates entirely at pH=4.1. $Al(OH)_3$ is completely soluble at pH<3.2. As a result, the control of the red mud leaching process being a complex multicomponent system is very difficult. Moreover, the variable content of alkali in the original mud does not make it possible to accurately predict the acidity and other properties of the resulting suspension. It should also be noted that the aliphatic carboxylic acids, including formic and acetic acid, are capable of holding the silicon compounds in solution with the formation of poorly separable colloidal residues of amorphous silica.

The object of the invention is to optimize the conditions for leaching red mud with acids during mud processing.

The technical result is to provide a high degree of valuable component recovery and to increase the productivity of the process.

The above technical result is achieved in that in a method for the acid treatment of red mud comprising leaching using as the leaching agent water-soluble aliphatic carboxylic acids with fewer than 3 carbon atoms in the molecule, filtering the solution, and separating the recoverable end products, the leaching is carried out with the batch addition of red mud with pH control, when the target pH of 2.3-3.8 is reached, stopping the addition of red mud, and upon completion of the leaching, keeping the solution at a given leaching temperature for at least one hour.

The acid treatment of red mud with maximum recovery of valuable components, a high process productivity, and an efficient separation of the resulting suspension into solid and liquid phases is achieved by controlling the pH, conducting the leaching at a given pH of 2.3-3.8, and keeping the solution at the given leaching temperature upon its completion.

The pH value of 2.3-3.8 is determined based on the concurrent provision of conditions for a high productivity of the acid treatment process and conditions for the subsequent filtration. At a pH value less than 2.3, the amount of red mud introduced into the process and treated is small. At a pH value greater than 3.8, the subsequent filtration is difficult, primarily because of the presence of highly dispersed amorphous silica, with substantially no filtering, and the start of the separation of highly dispersed aluminum hydroxide.

The method for the acid treatment of red mud was performed as follows.

The original red mud contained, %: $SiO_2$ 9.3; $Al_2O_3$ 12.4; $Fe_2O_3$ 44.3; $TiO_2$ 4.4; $P_2O_5$ 0.75; CaO 13.6; MgO 0.93; $Na_2O$ 2.9; $K_2O$<0.15; $V_2O_5$ 0.09; $Cr_2O_3$ 0.05; MnO 0.52; $SO_3$ 2.8; rare earth metals (total) 0.14; Sc $9.0 \cdot 10^{-3}$.

Leaching was carried out using as the leaching agent water-soluble aliphatic carboxylic acids with fewer than 3 carbon atoms in the molecule, namely, an aqueous solution of formic acid HCOOH, an aqueous solution of acetic acid, $CH_3COOH$, and mixtures thereof.

A temperature-controlled reactor having a stirring device and pH sensor was filled with a 15% solution of formic acid and/or acetic acid, the temperature was adjusted to 80° C., and then red mud was added in small portions with continuous pH monitoring. The procedure was terminated when a predetermined suspension acidity was reached (within the pH range=1.6-4.0), but stirring was continued for another hour after the last portion of the mud was added. Next stirring was stopped and the suspension was kept at the same temperature for another hour. The solid precipitate was then separated from the liquid by filtration, after which the solid and liquid phases were analyzed to determine the extent of recovery of the most valuable components in the solution.

The table below provides the recovery rates achieved by the above method for aluminum, scandium, and the rare earth metals, depending on the pH of the slurry after completion of the leaching process. The results obtained for both acids individually and for their equal-volume mixture differ insignificantly. With a shift to the alkaline side (increase in pH), a slight decrease in the recovery rate is observed, but process productivity improves at first sharply to a pH=2.3, and then more slowly to a pH=3.8. At pH=4.0 filtration becomes impossible due to the accumulation of a colloid consisting primarily of amorphous forms of silicon and aluminum compounds. As a result, it turned out that the optimal pH values at which red mud addition can be stopped are within the range of 2.3-3.8 for any combinations of acetic and formic acids.

In the industrial implementation of the method, the selection of the acids is determined only by their cost and availability. Compounds of aluminum, scandium, and rare earth metals found in solution are then recovered by known methods.

TABLE

| No. | pH of suspension after process completion | Recovery in solution, % | | | Productivity of mud acid treatment process, g/dm³ · h |
|---|---|---|---|---|---|
| | | Al | Sc | Rare earth metals (total) | |
| Formic acid | | | | | |
| 1 | 1.6 | 71.5 | 74.4 | 57.2 | 16.7 |
| 2 | 1.8 | 71.0 | 73.8 | 56.8 | 102.9 |
| 3 | 2.3 | 70.3 | 73.1 | 56.2 | 203.7 |
| 4 | 2.8 | 69.5 | 72.3 | 55.6 | 235.6 |
| 5 | 3.3 | 68.8 | 71.6 | 55.0 | 245.7 |
| 6 | 3.8 | 67.5 | 70.2 | 54.0 | 248.8 |
| 7 | 4.0 | Suspension not filtered | | | |
| Acetic acid | | | | | |
| 8 | 1.6 | 65.0 | 67.7 | 52.1 | 15.2 |
| 9 | 1.8 | 64.5 | 67.1 | 51.7 | 93.5 |
| 10 | 2.3 | 63.9 | 66.5 | 51.2 | 185.2 |
| 11 | 2.8 | 63.2 | 65.8 | 50.6 | 214.2 |
| 12 | 3.3 | 62.5 | 65.1 | 50.1 | 223.4 |
| 13 | 3.8 | 61.4 | 63.9 | 49.1 | 226.2 |
| 14 | 4.0 | Suspension not filtered | | | |
| Mixture of formic and acetic acid in a 1:1 proportion by volume | | | | | |
| 15 | 1.6 | 67.6 | 70.3 | 54.1 | 15.8 |
| 16 | 1.8 | 67.0 | 69.8 | 53.7 | 97.2 |
| 17 | 2.3 | 66.4 | 69.1 | 53.2 | 192.5 |
| 18 | 2.8 | 65.7 | 68.4 | 52.6 | 222.6 |
| 19 | 3.3 | 65.0 | 67.6 | 52.0 | 232.2 |
| 20 | 3.8 | 63.8 | 66.4 | 51.1 | 235.1 |
| 21 | 4.0 | Suspension not filtered | | | |

The invention claimed is:

1. A method for the acid treatment of red mud comprising:
 a. leaching red mud in a solution using a water-soluble aliphatic carboxylic acid having fewer than 3 carbon atoms as a leaching agent, wherein the leaching is carried out with red mud being added in small portions with continuous pH monitoring, wherein the addition of red mud is terminated when a predetermined solution acidity of pH of 2.3-3.8 is reached, and the solution is kept at a constant leaching temperature for at least one hour after the last portion of the mud is added;
 b. filtering the solution from step a. and separating recoverable end products.

* * * * *